US009855633B1

(12) United States Patent
Warne

(10) Patent No.: US 9,855,633 B1
(45) Date of Patent: Jan. 2, 2018

(54) BLADE SHARPENING SYSTEM

(71) Applicant: Monte Warne, Dyersburg, TN (US)

(72) Inventor: Monte Warne, Dyersburg, TN (US)

( * ) Notice: Subject to any disclaimer, the term of this patent is extended or adjusted under 35 U.S.C. 154(b) by 0 days.

(21) Appl. No.: 15/400,779

(22) Filed: Jan. 6, 2017

Related U.S. Application Data

(60) Provisional application No. 62/360,062, filed on Jul. 8, 2016.

(51) Int. Cl.
| | | |
|---|---|---|
| *B24B 3/36* | (2006.01) | |
| *B24B 51/00* | (2006.01) | |
| *B24B 19/00* | (2006.01) | |
| *B24B 49/10* | (2006.01) | |
| *B23F 23/12* | (2006.01) | |

(52) U.S. Cl.
CPC .............. *B24B 3/36* (2013.01); *B24B 19/002* (2013.01); *B24B 49/10* (2013.01); *B24B 51/00* (2013.01); *B23F 23/1237* (2013.01)

(58) Field of Classification Search
CPC .......... B23D 47/04; B23D 47/08; B24B 3/06; B24B 19/002; B24B 49/10; B24B 51/00; B27B 5/208
See application file for complete search history.

(56) References Cited

U.S. PATENT DOCUMENTS

| | | | | |
|---|---|---|---|---|
| 4,055,160 A | * | 10/1977 | Wilson .................... | B27G 19/02 125/13.03 |
| 4,446,845 A | * | 5/1984 | Harding ................. | B23D 47/12 125/13.03 |
| 5,746,193 A | * | 5/1998 | Swan ...................... | B28D 1/042 125/13.03 |
| 6,080,041 A | * | 6/2000 | Greenland .............. | B24B 49/00 125/13.01 |
| 6,752,140 B1 | * | 6/2004 | Fuhrman ................ | B23D 45/02 125/13.01 |
| 6,883,511 B1 | * | 4/2005 | Tsao ....................... | B23D 47/02 125/13.01 |
| 6,978,707 B2 | * | 12/2005 | Lee ......................... | B23D 45/02 125/13.03 |
| 9,616,593 B2 | * | 4/2017 | Elemstrand ............ | B28D 1/044 |

(Continued)

OTHER PUBLICATIONS

Foley United—believed to be available by Sep. 21, 2011 at https://web.archive.org/web/20110921065556/http://www.foleyunited.com/460-automated-rotary-grinder.

(Continued)

*Primary Examiner* — Timothy V Eley
(74) *Attorney, Agent, or Firm* — Akerman LLP

(57) ABSTRACT

A blade sharpening system may include a sharpening tool for sharpening a workpiece. The system may also include a sharpening fixture having a mounting surface for mounting a workpiece to be sharpened by the sharpening tool. The mounting surface may be disposed on a sled that is movable along a sharpening path that passes under a sharpening implement that may be mounted to a movable arm of the sharpening tool when the arm is in an engaged position. The movement of the sled may be coupled to the movement of the arm such that moving the arm from a disengaged position to the engaged position initiates the sled to move in a first direction along the sharpening path and moving the arm from the engaged position to the disengaged position initiates the sled to move along the sharpening path in a second direction.

20 Claims, 9 Drawing Sheets

(56) References Cited

U.S. PATENT DOCUMENTS

| | | | |
|---|---|---|---|
| 2008/0087153 A1* | 4/2008 | Lee ........................ | B23D 45/02 |
| | | | 83/435.11 |
| 2015/0073579 A1* | 3/2015 | Dick ...................... | B23D 45/14 |
| | | | 700/114 |

OTHER PUBLICATIONS

Oregon Standard—believed to be available by Nov. 13, 2012 at https://web.archive.org/web/20121113232919/http://www.oregonproducts.com:80/pro/products/oep/blade_grinder_88-019.htm.

U.S. Appl. No. 15/486,915, filed Apr. 13, 2017.

* cited by examiner

BLADE SHARPENING SYSTEM

CROSS-REFERENCE TO RELATED APPLICATIONS

This patent application claims the benefit of the filing data under 35 U.S.C. §119(e) of U.S. Provisional Patent Application No. 62/360,062, filed Jul. 8, 2016, the contents of which is hereby incorporated by reference into this specification.

TECHNOLOGY

The present disclosure relates to systems and methods for sharpening blades.

BACKGROUND

Blades are traditionally sharpened using fixed bench or pedestal grinders. The grinders include rotating grinding wheels against which a blade edge is worked. Workpieces on which the blade edge is worked are typically held by an operator and manually moved against the grinding stone to form the sharpened edge.

SUMMARY

In one aspect, a blade sharpening system includes a sharpening tool comprising an arm movable between a disengaged position and an engaged position, an implement positioned mount on the arm to mount a sharpening implement, and a motor operable to rotate the implement mount to rotate a sharpening implement when mounted thereon. The blade sharpening system may further include a sharpening fixture comprising a frame. The frame may include a first support comprising a mounting bracket for mounting the frame to a platform above which the arm is pivotably mounted between the disengaged and engaged positions. The frame may further comprise a sled guide including one or more rails, a sled movably mounted to the frame and having a mounting surface for removably mounting a workpiece to be sharpened, and a sled drive coupled to the sled. The sled drive may be operable to move the sled along the sled guide along a sharpening path to position a workpiece, mounted to the mounting surface, below a sharpening surface of a sharpening implement mounted to the arm in the engaged position when the sled moves along an engagement portion of the sharpening path. The sharpening system may further include a controller comprising a drive switch to initiate the sled drive to move the sled along the sharpening path and a position sensor to measure a position of the arm or associated component thereon. When the position sensor measures the arm translated from the disengaged position to the engaged position, the drive switch may initiate the sled drive to move the sled along the sharpening path in a first direction. When the position sensor measures the arm translated from the engaged position to the disengaged position, the drive switch may initiate the sled drive to move the sled along the sharpening path in a second direction. The engaged position may further include a physically engaged position wherein when the arm is in the physically engaged position a sharpening surface of a mounted sharpening implement is positioned to physically engage a workpiece mounted to the mounting surface as the sled moves along the engagement portion of the sharpening path.

In various implementations, the sled drive comprises an air cylinder operatively coupled between the frame and the sled, and the drive switch comprises an air switch. The sled guide may extend between a first support comprising a first guide bracket and a second support comprising a second guide bracket. The sled may be movable along the sled guide between the first guide bracket and the second guide bracket. The first guide bracket may comprise a first portion structured to be fixedly mounted to the first support and a second portion structured to be slidably mounted to the first support. An adjustment rod may be rotatably coupled at an end to the second portion of the first guide bracket and may be structured to threadably coupled to the first portion of the first guide bracket such that rotation of the adjustment rod adjusts a length of the adjustment rod extending through the first portion of the guide bracket to thereby adjust a distance between the first and second portions of the first guide bracket. The mounting surface may comprise a mounting member structured to removably mount a workpiece. The mounting member may comprise one or more of a clamp or an adjustable cam. The second guide bracket may be structured to adjustably receive the sled guide to define a length of the sled guide extending between the first and second guide brackets. The first guide bracket may include a roller positioned to support a portion of the sled below a sharpening implement mounted to the arm when the sharpening implement physically engages the workpiece while the sled moves along the sharpening path.

In another aspect, a blade sharpening system includes a sharpening tool comprising an arm movable between a disengaged position and an engaged position, an implement mount positioned on the arm to mount a sharpening implement, and a motor operable to rotate the implement mount to rotate a sharpening implement when mounted thereon. The blade sharpening system may further include a sharpening fixture comprising a frame, a sled movably mounted to the frame and having a mounting surface for removably mounting a workpiece to be sharpened, and a sled drive coupled to the sled and operable to move the sled along the frame along a sharpening path to position a workpiece, mounted to the mounting surface, below a sharpening surface of a sharpening implement mounted to the arm in the engaged position. The blade sharpening system may further include a controller comprising a drive switch to initiate the sled drive to move the sled along the sharpening path and a position sensor to measure a position of the arm or associated component thereon. When the position sensor measures the arm translated from the disengaged position to the engaged position, the drive switch may initiate the sled drive to move the sled along the sharpening path in a first direction. When the position sensor measures the arm translated from the engaged position to the disengaged position, the drive switch may initiate the sled drive to move the sled along the sharpening path in a second direction.

In various implementations, the engaged position further includes a physically engaged position wherein when the arm is in the physically engaged position a sharpening surface of a mounted sharpening implement is positioned to physically engage a workpiece mounted to the mounting surface as the sled moves along the engagement portion of the sharpening path. The sled drive may comprise an air cylinder operatively coupled between the frame and the sled. The drive switch may comprise an air switch. The frame may comprise a first support comprising a mounting bracket for mounting the frame to a platform above which the arm is pivotably mounted between the disengaged and engaged positions. The frame may comprise a sled guide comprising one or more rails along which the sled drive is structured to move the sled along the sharpening path. In one implementation, the one or more rails of the sled guide may extend between a first guide bracket and a second guide bracket. The sharpening fixture may include a path adjuster to adjust a length of the one or more rails the sled drive moves the sled along the sharpening path between the first and second guide bracket. In one example, the second guide bracket may include a slot to adjustably receive the one or more rails of sled drive moves the sled along the sharpening path between the first and second guide bracket. In another example, the sharpening fixture may include one or more floating stops slidably mounted along the one or more rails and fixable at one or more positions there along to adjust a length of the one or more rails the sled drive moves the sled along the sharpening path. In one implementation, the frame includes a sled guide extending between a first support comprising a first guide bracket and a second support comprising a second guide bracket. The sled may be movable along the sled guide between the first guide bracket and the second guide bracket. The second guide bracket may be structured to adjustably receive the sled guide to define a length of the sled guide extending between the first and second guide brackets. The frame may include a sled guide along which the sled drive is structured to move the sled along the sharpening path.

In one implementation, the sharpening fixture may include a guide adjuster to adjust the angle or position at which the sharpening path passes below a sharpening surface of a sharpening implement mounted to the arm. The guide adjuster may comprise a first portion of the first guide bracket structured to be fixedly mounted to the first support and a second portion of the first guide bracket structured to be slidably mounted to the first support. The guide adjuster may further comprise an adjustment rod rotatably coupled at an end to the second portion of the first guide bracket and structured to threadably coupled to the first portion of the first guide bracket such that rotation of the adjustment rod adjusts a length of the adjustment rod extending through the first portion of the guide bracket to thereby adjust a distance between the first and second portions of the first guide bracket. The mounting surface may comprise one or more mounting members structured to removably mount a workpiece. The one or more mounting members may comprise a clamp. The one or more mounting members may also comprise an adjustable cam. In one example, the adjustable cam has a "D" shape. The sled guide may comprise one or more rails extending between a first guide bracket and a second guide bracket, wherein the first guide bracket includes a roller positioned to support a portion of the sled below a sharpening implement mounted to the arm when the sharpening implement physically engages the workpiece while the sled moves along the sharpening path.

In yet another aspect, a controllable sharpening fixture includes a frame comprising a first support comprising a mounting bracket for mounting the frame to a platform of a sharpening tool comprising an arm configured to mount a sharpening implement and pivotable between a disengaged position and an engaged position, wherein the frame further comprises a sled guide comprising one or more rails. The sharpening fixture may further include a sled movably mounted to the frame and having a mounting surface for removably mounting a workpiece to be sharpened. The sharpening fixture may also include a sled drive coupled to the sled and operable to move the sled along the sled guide along a sharpening path to position a workpiece, mounted to the mounting surface, below a sharpening surface of a sharpening implement mounted to the arm of the sharpening tool in the engaged position when the sled moves along an engagement portion of the sharpening path. The controllable sharpening fixture may further comprise a controller including a drive switch to initiate the sled drive to move the sled along the sharpening path and a position sensor to measure a position of the arm or associated component thereon. When the position sensor measures the arm translated from the disengaged position to the engaged position, the drive switch may initiate the sled drive to move the sled along the sharpening path in a first direction. When the position sensor measures the arm translated from the engaged position to the disengaged position, the drive switch may initiate the sled drive to move the sled along the sharpening path in a second direction.

In various implementations, the sled drive may comprise an air cylinder operatively coupled between the frame and the sled, and wherein the drive switch comprises an air switch. The sled guide may extend between a first support comprising a first guide bracket and a second support comprising a second guide bracket. The sled may be movable along the sled guide between the first guide bracket and the second guide bracket. The first guide bracket may comprise a first portion structured to be fixedly mounted to the first support and a second portion structured to be slidably mounted to the first support. An adjustment rod may be rotatably coupled at an end to the second portion of the first guide bracket and may be structured to threadably couple to the first portion of the first guide bracket such that rotation of the adjustment rod adjusts a length of the adjustment rod extending through the first portion of the guide bracket to thereby adjust a distance between the first and second portions of the first guide bracket.

In one implementation, the sled guide may extend between a first support comprising a first guide bracket and a second support comprising a second guide bracket. The sled may be movable along the sled guide between the first guide bracket and the second guide bracket. The second guide bracket may be structured to adjustably receive the sled guide to define a length of the sled guide extending between the first and second guide brackets. The first guide bracket may include a roller positioned to support a portion of the sled below a sharpening implement mounted to the arm when the sharpening implement physically engages the workpiece while the sled moves along the sharpening path.

In one implementation, the mounting surface may include a mounting member structured to removably mount a workpiece, the mounting member comprising one or more of a clamp or an adjustable cam. In one example, the adjustable cam has a "D" shape.

BRIEF DESCRIPTION OF THE DRAWINGS

For a more complete understanding of the present disclosure and its features and advantages, reference is now made to the following description, taken in conjunction with the accompanying drawings, in which.

DESCRIPTION

Various embodiments of a blade sharpening system and components thereof are described herein. Some embodiments may find particular utility for sharpening mower blades. However, the blade sharpening system may find applicability to for sharpening other workpieces such as knives, axes, agricultural implements, etc. Indeed, various embodiments of the blade sharpening system may be configured to sharpen a wide variety of workpiece sizes and shapes. For example, as described below, the blade sharpening system may be configured with adjustable features allowing an operator conform the operation of the system to a desired workpiece.

In various embodiments, a blade sharpening system may include a sharpening tool configured to move a sharpening implement, such as a grinding stone, in a sharpening motion. The blade sharpening system may also include a sharpening fixture having a mounting surface onto which a workpiece may be stably held for sharpening. The sharpening fixture may be structured to position the mounting surface relative to the sharpening implement to engage a sharpening surface of the sharpening implement with the workpiece. The sharpening fixture may be further structured to move the workpiece when the sharpening surface is engaged with the sharpening implement such that the sharpening implement engages a length of the workpiece greater than the width of the sharpening surface. In some embodiments, the sharpening tool is also structured to move the sharpening implement between an engaged and a disengaged position. In one embodiment, movement of the sharpening implement toward the sharpening fixture triggers the blade sharpening system to move the mounting surface in a first direction from a first position to a second position. When the mounting surface has reached the second position, the blade sharpening system may trigger movement of the mounting surface in a second or return direction to a third position. The third position may correspond to the first position. In this or another embodiment, movement of the sharpening implement away from the sharpening fixture triggers the blade sharpening system to move the mounting surface in the second or return direction.

Figure 1:
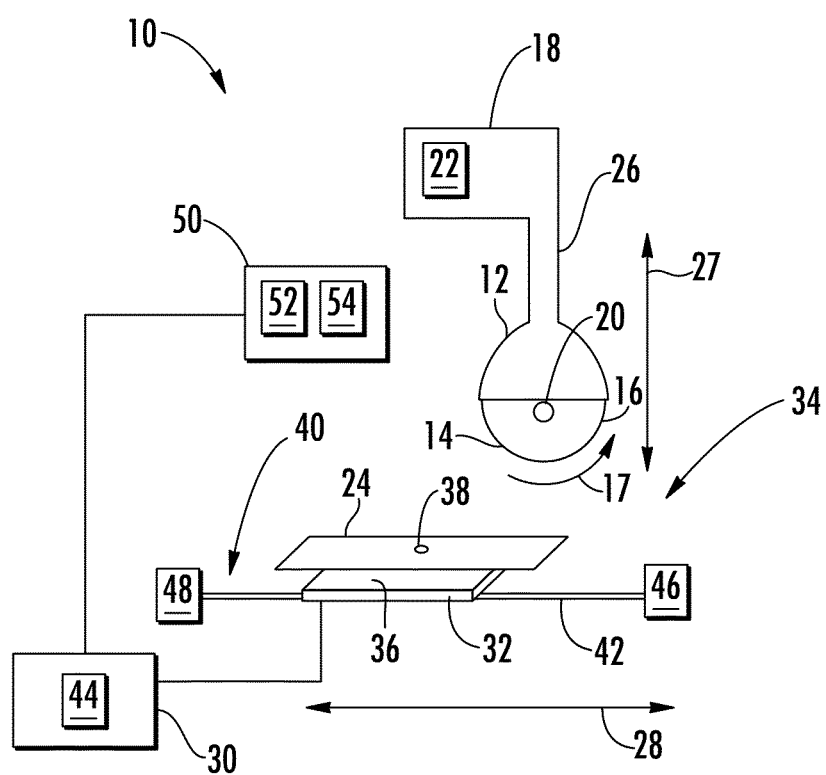
FIG. 1 is a semi-schematic of a blade sharpening system according to various embodiments described herein.

FIG. 1 semi-schematically illustrates various features of a blade sharpening system 10 according to various embodiments. The blade sharpening system 10 includes a sharpening tool 12 and a sharpening implement 14 having a sharpening surface 16. The implement may be, for example, a grinding wheel or belt.

The sharpening tool 12 includes or is operatively coupled to an implement drive 18 operative to cause the sharpening implement 14 and sharpening surface 16 to move in a sharpening motion. The sharpening implement 14 is configured to sharpen a surface, such as an edge, of a workpiece 24 that contacts or physically engages the sharpening surface 16 when the sharpening implement 14 is moved in the sharpening motion (shown generally by arrow 17). In one example, the implement drive 18 includes an implement mount 20, e.g., an arbor or pulley, onto which the sharpening implement 14 may be mounted. The implement drive 18 may also include an implement motor 22 whereby operation of the implement motor 22 provides force or motion to rotate implement mount 20 that then rotates the mounted sharpening implement 14.

The implement motor 22 may be any suitable motor for providing force or motion to rotate implement mount 20. For example, the implement motor 22 may include an electric, combustion, chemical, hydraulic, thermal, or pneumatic motor. An electric motor may include, for example, rotatory, linear, servo, or stepper type motors. In some embodiments, the implement motor 22 may include a pump configured to pump fluid. The pump may provide power to a motor portion of the implement motor 22, e.g., a hydraulic or pneumatic motor, or may be powered by the implement motor 22.

The movement of the implement mount 20 to provide the sharpening motion 17 may be mechanically or electronically controlled. For example, movement may be initiated or terminated mechanically or electronically, e.g., either by the powering of the implement motor 22 or delivery or transfer of the force or motion produced by the implement motor 22 to move the implement mount 20, e.g., engagement of a clutch. In one embodiment, a manual actuator or trigger may be used, which may be local or remote.

The sharpening tool 12 may also be structured to move the sharpening implement 14 between an engaged position and a disengaged position. The engaged position may include a position in which the sharpening surface 16 of the sharpening implement 14 is physically engaged with a workpiece 24. The engaged position may also include a position in which the sharpening implement 14 is positioned for physical engagement but additional movement of the sharpening implement 14 toward the workpiece 24 is required in order for the sharpening surface 16 of the sharpening implement 14 to physically engage the workpiece 24. In which case, the sharpening implement 14 is further movable between the engaged position and the physically engaged position.

In one embodiment, the sharpening tool 12 includes an arm 26 housing the implement mount 20 onto which the sharpening implement 14 may be mounted. The arm 26 may be movable (shown generally by arrow 27) to engage and disengage the sharpening implement 14 with workpiece 24. In one example, the sharpening tool 12 may have a chop saw configuration comprising a movable arm 26 having an arbor onto which the sharpening implement 14, e.g., a grinding stone, may be mounted. It will be appreciated that while a grinding stone is generally described herein as comprising a grinding wheel, other grinding stone configurations may be used, e.g., a grinding belt.

The arm 26 may be movable between the engaged position and a disengaged position, corresponding to an engaged position and disengaged position of the sharpening implement 14 when mounted to the implement mount 20. The movement of the arm 26 may be along linear, arcuate (e.g., about a pivot), or other shaped paths. In some embodiments, the sharpening tool 12 may be structured such that the arm 26, under its own weight, may rest above the workpiece 24 in an engaged position or adjacent thereto, or the position of the workpiece 24 when moved along a sharpening path (shown generally as arrow 28), and be movable therefrom to the physically engaged position upon application of force, e.g., by a user. For example, the sharpening tool 12 may be equipped with a spring, shock absorber, cushion, etc. that is to be manually or otherwise overcome by application of additional force to the arm 26 to physically engage the workpiece 24 with the sharpening surface 16. In one such embodiment, the arm 26 may rest in the engaged position that does not correspond to the physically engaged position. When the arm 26 rests outside, e.g., above the physically engaged position, upon application of force, the arm 26 may be movable to the physically engaged position where the sharpening surface 16 of the sharpening implement 14 contacts the workpiece 24.

Movement of the arm 26 may be driven manually or entirely or partially mechanically assisted, e.g., with gearing, hydraulics, pneumatics, or other suitable arrangements or combinations thereof. In some embodiments, mechanical assistance may be powered. For example, mechanical assistance may be powered separately from the implement drive 18 or a sled drive 30, described below, or may be powered in-whole or in-part by one or both of the implement drive 18 or sled drive 30. In various embodiments, the sharpening tool 12 is configured with an adjustable arm 26 to allow a user to define the range of movement of the arm 26 to accommodate different sized implements 14 and workpieces 24. Adjusting the range of movement of the arm 26 may also include defining the engaged and disengaged positions. In one embodiment, the sharpening tool 12 may include a table or fixture mounting platform (not shown) that is movable toward the sharpening implement 14 in a direction different than the direction of movement of a sled 32 along the sharpening path 28. In one example, the sharpening tool 12 includes both a movable arm 26 and a movable fixture mounting platform to define a distance between the workpiece 24 and a position of the sharpening implement 14.

In various embodiments, the blade sharpening system 10 may include a sharpening fixture 34. The blade sharpening system 10 may be configured such that, in use, the sharpening surface 16 of the sharpening implement 14 is positioned to contact the surface to be sharpened while the sharpening fixture 34 moves the workpiece 24 relative to the sharpening surface 16 along the engagement portion of the sharpening path 28. The sharpening fixture 34 may include a table onto which the workpiece 24 may be mounted. The table may be referred to herein as a sled 32 having a workpiece 24 mounting surface 36. The mounting surface 36 may be structured to removably mount a workpiece 24 thereon. The sled 32 may include various mounting fittings 38 structured to stably mount the workpiece 24 to the mounting surface 36. For example, exemplary mounting fittings 38 may include clamps, braces, brackets, slots, grooves, mounting pins or threads, or other features employable to stably hold a workpiece 24 at the mounting surface 36 during sharpening.

As introduced above, the sled 32 may be movable to thereby correspondingly move the mounting surface 36 along the sharpening path 28. The sharpening path 28 includes an engagement portion wherein a mounted workpiece 24 moved along the engagement portion intersects with the sharpening surface 16 of the sharpening implement 14 in the physically engaged position. Thus, the movement of the sled 32 along the sharpening path 28 may translate the mounted workpiece 24 through a location corresponding to the sharpening surface 16 of the sharpening implement 14 when the arm 26 and sharpening implement 14 are in the physically engaged position. For example, the engagement portion of the sharpening path 28 may be configured to pass a surface of the workpiece 24 to be sharpened along the sharpening surface 16 of the sharpening implement 14 when the arm 26 and, hence, the sharpening implement 14 are in the physically engaged position. In embodiments wherein the engaged position includes a position that does not correspond to the physically engaged position, e.g., a pre- or post-physically engaged position, the engagement portion of the sharpening path 28 may pass the workpiece 24 adjacent to, e.g., just below, the sharpening implement 14 or sharpening surface 16 thereof, such that when the arm 26 further translates to the physically engaged position, the sharpening surface 16 of the sharpening implement 14 contacts the surface of the workpiece 24 to be sharpened.

The sharpening fixture 34 may also include a frame 40 structured to support the sled 32 when the sled 32 moves along the sharpening path 28. For example, the sled 32 may be slidably or rollably positioned on or mounted at a surface of the frame 40. The frame 40 may include a sled guide 42 to guide the sled 32. The frame 40 may include tracks, rails, rollers, grooves, or other supporting structures along which the sled 32 may engage and transverse when moving along the sharpening path 28.

In various embodiments, the sharpening fixture 34 may include a sled drive 30 configured to move the sled 32 along the sharpening path 28 in a first direction and a second direction. The sled drive 30 may include a drive motor 44. The drive motor 44 may be the same or different than the implement motor 22. The drive motor 44 may be any suitable motor for driving movement of the sled 32, either directly or indirectly. For example, the drive motor 44 may include an electric, combustion, chemical, hydraulic, thermal, or pneumatic motor. An electric drive motor 44 may include rotatory, linear, servo, or stepper type motors, for example. In some embodiments, the drive motor 44 is reversible to actively drive movement of the sled in both the first and second directions.

The sled drive 30 may include one or more rods, pistons, belts, gears, pulleys, chambers, valves, actuators, transfer cases, gear boxes, or other drive components configured to drive the sled 32 via the motion or force provided by the drive motor 44. In one embodiment, the sled drive 30 includes a rod coupled between a drive shaft of a linear motor and the sled 32 to transmit the linear motion or force to the sled 32. In one example, the sled drive 30 includes gears or tracks positioned to receive the motion or force provided by the drive motor 44 to move the sled 32. The drive motor 44 and sled drive 30 may be configured for direct or indirect drive operations. For example, power provided by the drive motor 44 may rotate gears that may drive or engage gears on the sled drive 30 to move the sled 32. Belts, pulleys, or chains may also be used. In one embodiment, the drive motor 44 includes a drive shaft directly or indirectly driven by the drive motor 44 to provide rotational force of motion that mechanically couples to the sled drive 30 to drive the sled 32. For example, the drive motor 44 may be positioned to provide rotational force in a direction transverse to a direction of movement of the sled 32. In one configuration, a screw and nut, or other gear arrangement, may be used to convert the rotational motion to linear motion.

In some embodiments, the drive motor 44 includes a pump configured to pump fluid. The pump may provide power to a motor portion of the drive motor 44, e.g., a hydraulic or pneumatic motor, or may be powered by the motor portion of the drive motor 44. In one example, the sled drive 30 includes a hydraulic or pneumatic chamber into which fluid may be pumped into or out of or released into or out of to move a piston. The sled 32 may be operatively coupled to the chamber or piston to move when the piston is moved within the chamber. In these or other examples, the sled drive 30 or chamber thereof may include one or more valves fluidically coupled to the chamber and actuatable to control fluid flow into or out of the chamber. A chamber, such as a cylinder chamber, may include a fluid port fluidically coupled to a valve. The valve may open to allow fluid to be delivered into the chamber thereby moving the piston in a first direction. The valve or another valve may later open to allow the fluid to exit the chamber. In one embodiment, the fluid withdrawn to create a vacuum within the chamber to pull the piston in a second direction. In this or another embodiment, the chamber includes a spring compressible by the movement of the piston in the first direction and which decompresses to move the piston in the second direction when the fluid exits the chamber. In one embodiment, the sled drive 30 includes a chamber having two chambers in which fluid may be supplied and released to move the piston in the first and second direction. For example, valves may be used to provide fluid into the first chamber and allow fluid to exit the second chamber thereby moving the piston in the first direction. The same or different valves may be used to provide fluid into the second chamber and allow fluid to exit the first chamber thereby moving the pistons in the second direction.

In various embodiments, the blade sharpening system 10 includes a guide adjuster 46 to adjust the location of the sharpening path 28 relative to the sharpening implement 14 in the physically engaged position. For example, the guide adjuster 46 may adjust an angle of the sharpening path 28 with respect to the sharpening implement 14 in the physically engaged position. As another example, the guide adjuster 46 may laterally adjust the location of the sharpening path 28 with respect to the sharpening implement 14, which may adjust a relative location along the sharpening implement 14 where the sharpening surface 16 contacts the workpiece 24. For example, the guide adjuster 46 may be used to sharpen a first surface and a second surface of a workpiece 24 wherein the first and second surfaces are edges on opposite lateral sides of the workpiece 24. Thus, the guide adjuster 46 may allow the blade sharpening system 10 to be used to sharpen both right hand cut and left hand cut mower blades. It should be noted that in some embodiments, the motion or force provided by the sled drive 30 to move the sled 32 may define the sharpening path 28 and therefore comprise the sled guide 42.

In various embodiments, the blade sharpening system 10 includes path adjusters 48 to adjust a length of the sharpening path 28. Path adjusters 48 may include stops to limit translation along the sharpening path 28 in the first direction, second direction, or both.

In various embodiments, the blade sharpening system 10 includes a controller 50. The controller 50 may be operative to control one or more operations of the blade sharpening system 10, e.g., the implement drive 18, sled drive 30, arm 26, or other operations. In some embodiments, the controller 50 includes a drive switch 52 operable to initiate movement of the sled 30 as described herein.

The controller 50 may include one or more hardwired circuits, programmable circuits, or combinations thereof. In one embodiment, the controller 50 may include memory storing instructions executable by a processor to perform one or more operations of the blade sharpening system 10. For example, a memory or circuit may be programmed such that when an actuator or trigger is actuated, movement of the implement mount 20 is initiated to produce the sharpening motion 17 with respect to the sharpening implement 14 and the movement is stopped when the actuator or trigger is released or after a predefined time period. Notably, in some embodiments, all components of the controller 50 may not be in communication or otherwise linked. For example, control of the rotation of the implement mount 20 may be a separate circuit than another circuit used to control other operations, such as the drive switch 52 used to initiate the sled drive 30, e.g., providing power to a drive motor or allowing transmission of power, motion, or force to the sled drive 30 to move the sled 32.

In this or another example, the controller 50 may be operable to initiate or terminate movement of the sled 32 in the first direction or second direction. For example, the controller 50 may be operable, via the drive switch 52, to control one or more of initiating or terminating the drive motor 44, a drive pump portion of the drive motor 44, power delivery to the drive motor 44, delivery of force or motion from the drive motor 44 to the sled drive 30.

The controller 50 may be configured such that the drive switch 52 may initiate movement of the sled 32, via the sled drive 30, manually or automatically. In one example, the blade sharpening system 10 includes a controller 50 that is wired or programmed to modulate or sequence power delivery to a drive motor 44. In this or another embodiment, a trigger may be provided on the arm 26, at another location of the sharpening tool 12 or sharpening fixture 34, or remotely to trigger the drive switch 52 to initiate movement of the sled 32 via the sled drive 30.

In some embodiments, the controller 50 comprises a position sensor 54 to measure, e.g., detect or sense, a movement or a position of the arm 26, implement mount 20, sharpening implement 14 or surface. In another embodiment, however, a position sensor 54 is not used. The measurement of the position sensor 54 may be used by the controller 50 via operation of the drive switch 52 to initiates movement of the sled 32 along the sharpening path 28. For example, when the position sensor 54 measures the arm 26 or an associated component of the arm 26 translated into or out of the engaged position, the position sensor may signal the controller 50 or component thereof to initiate movement of the sled 32 via the sled drive 30. For example, the controller 50 may comprise a drive switch 52 configured to initiate the predefined movement upon receiving a position signal from the position sensor 54. In some embodiments, the controller 50 comprises a position sensor 54 that is integrated with the drive switch 42 or one or more additional switches to initiate movement of the sled 32. In further embodiments, the position sensor 54 may include a mechanically actuatable drive switch 52. An integrated position sensor 54 and drive switch 52 may further signal additional switches to initiate a predefined movement of the sled 32, such as power switches to supply power to the drive motor 44, valve switches to actuate valves to drive operation of the drive motor 44 or various components of the sled drive 30, or other switch configurations. In various embodiments, the position sensor 54 may include sensors configured to detect position or movements by optical, electrical, magnetic, electromagnetic, gravitational, pressure, mechanical, or any other suitable mechanism.

Initiation of movement may include powering of the drive motor 44. Initiation of movement may include engagement or utilization of power generated by the drive motor 44. In one embodiment, the release of a compressed spring, gas, or both may be used to drive the movement of the sled 32 along the sharpening path 28. For example, initiation may include releasing a compressed spring or opening valves to release compressed fluid. In a further example, initiation may include opening one or more valves to allow compressed fluid to enter a drive chamber structured to transmit motion produced by the compressed fluid to the sled 32.

In one embodiment, the drive switch 52 includes a manual trigger that may be used to initiate the sled drive 30 to move the sled 32 along the sharpening path 28. The trigger may be a hand trigger or foot pedal, for example. In this or another embodiment, the trigger may also be used as a safety switch, e.g., a dead man switch, that must be actuated for the movement of the sled 32 to be triggerable, e.g., by movement of the arm 26. The trigger may be the same or a separate trigger than a trigger used to initiate movement of the implement mount 22.

In one embodiment, the controller 50 may be further operable to initiate or terminate the implement motor, power delivery to the implement motor, transfer of motion or force produced by the implement motor to the sharpening implement 14. Operation of the sharpening tool 12 to produce the sharpening motion 17 may be coupled with movement of the arm 26 or may be separate, e.g., using a trigger or actuator to supply power to the implement motor or initiate transfer of force to the implement mount 20, e.g., employing a clutch.

In various embodiments, the controller 50 may be operatively coupled to the sharpening tool 12 and the sled drive 30 to initiate the sled drive 30 to move the sled 32 in the first direction when the arm 26 is in the engaged position and to initiate the sled drive 30 to move the sled 32 in the second direction when the arm 26 is in the disengaged position. In one example, the controller 50 is programmed, which may include hardwiring, to initiate movement of the implement mount 20, and, hence, the sharpening motion 17 of the sharpening implement 14, when the arm 26, implement mount 20 (e.g., an arbor or pulley), or sharpening implement 14 are in the engaged position. For example, the blade sharpening system 10 may include electrical or mechanical sensors operatively coupled to the controller 50 and positioned to detect the location of one or more of the arm 26, implement mount 20, or sharpening implement 14. In various embodiments, the controller 50 may include one or more additional switches, sensors, or combinations thereof to detect conditions of the blade sharpening system 10.

As introduced above, the engaged position may be a position wherein the sharpening surface 16 of the sharpening implement 14 is adjacent to but not in physical contact with the workpiece 24. For example, the engaged position may be about an inch above the workpiece 24. Larger or smaller distances may be used. Indeed, in one embodiment, the blade sharpening system 10 includes a controller 50 configured with an engagement position adjuster that allows the user to define the engaged position. For example, the user may turn a knob, actuate a lever, or select a position from a user interface. Depending on the configuration, such operations may modify the engagement position by adjusting the position of a controller 50 switch that is actuatable by movement of the arm 26 or the position or sensitivity of a position sensor 54 that detects the position of the arm 26 or associated structure. In some embodiments, the engaged position may be adjusted to correspond with the physically engaged position. In one embodiment, however, the location of the engaged position cannot be adjusted. In one such example, the engaged position may correspond with the physically engaged position.

Figure 2:
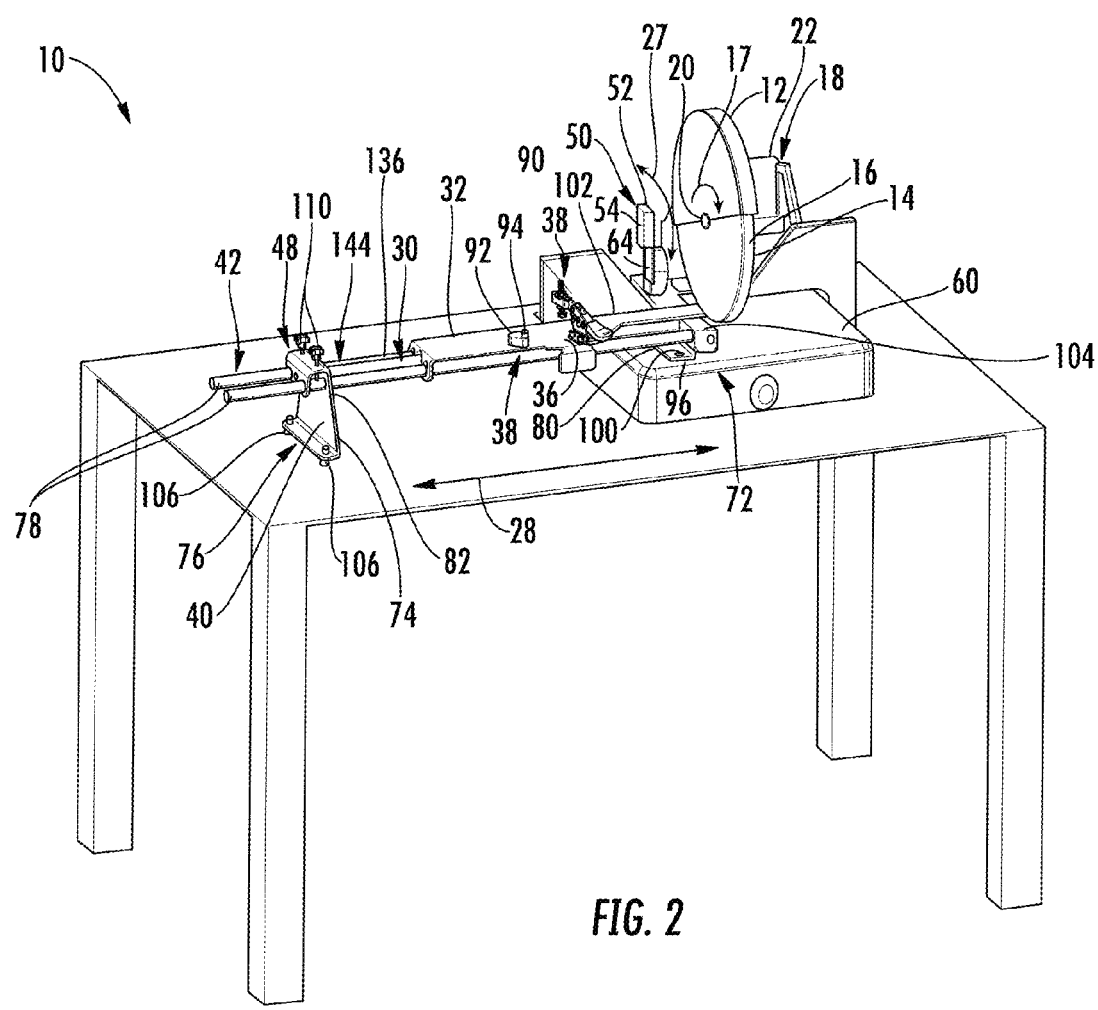
FIG. 2 is an perspective view blade sharpening system positioned on a table according to one embodiment described herein.

With reference to FIG. 2, illustrating an exemplary embodiment of a blade sharpening system 10, and FIGS. 4A-4D, illustrating various views of another exemplary embodiment of the blade sharpening system 10, wherein like numbers are used to indicate simple features, the blade sharpening system 10 includes a sharpening tool 12 including a mounting platform 60. The sharpening tool 12 includes a sharpening implement 14 having a sharpening surface 16 configured to engage and thereon work a surface of a workpiece (see, e.g., FIG. 1) to be sharpened. More specifically, the sharpening implement 14 comprises a grinding stone, e.g., a grinding wheel, mounted to an implement mount 22 comprising an arbor. The sharpening tool 12 further comprises an implement drive 18 configured to drive the sharpening implement 14 in a sharpening motion 17, which in this embodiment includes rotation of the sharpening implement 14 on the arbor. The implement drive 18 includes an implement motor 22 structured to rotate the arbor and hence the grinding stone mounted thereon.

The sharpening tool 12 has a chop saw configuration and includes a movable arm 26 from which the arbor extends. The arm 26 is mounted on at pivot 66 and is rotatable thereon 27 between a disengaged position, away from the platform 60, and an engaged position, adjacent to the platform 60 (as shown). As described above, the engaged position may correspond to a physically engaged position or may be adjacent to the physically engaged position such that the arm 26 may be rotated downward from the engaged position to the physically engaged position, e.g., by a user.

Figure 3:
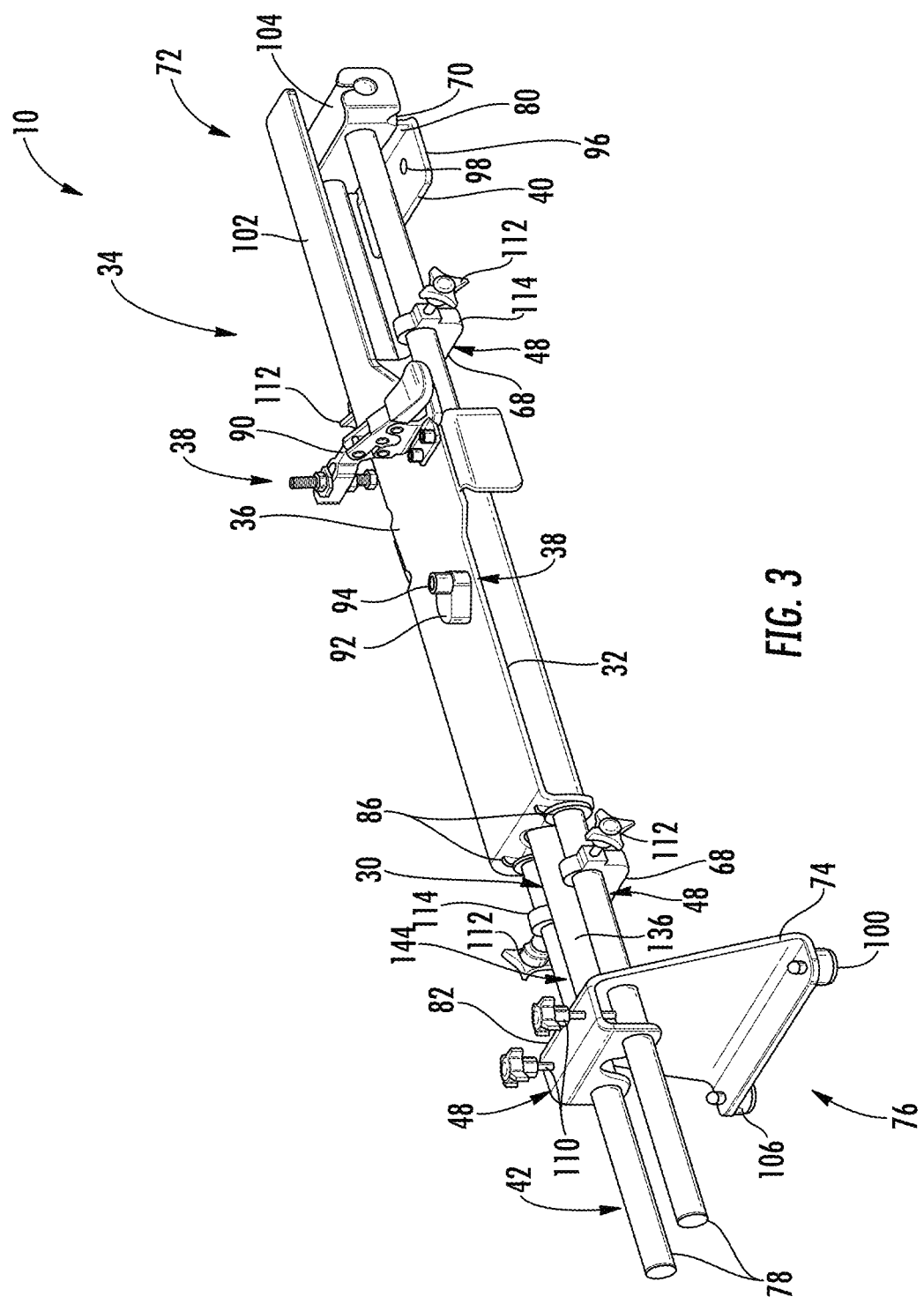
FIG. 3 is an isolated perspective view of the sharpening fixture of the blade sharpening system shown in FIG. 2 including floating stops.

The blade sharpening system 10 further includes a sharpening fixture 34 configured to move the workpiece relative to the sharpening surface 16 along a sharpening path 28. With continued reference to FIG. 2 & FIGS. 4A-4D and further reference to FIG. 3, showing an isolated view of the sharpening fixture 34 of FIG. 2 fitted with path adjusters 48 comprising floating stops 68, the sharpening fixture 34 includes a frame 40 and a sled 32. The sled 32 is movably mounted on the frame 40 along a sled guide 42. The frame 40 includes a first support 70 at a first end 72 and a second support 74 at a second end 76. The first support 70 may be attached to the platform 60. The second support 74 may be configured to support the frame 40 on an adjacent or other surface. The sled guide 42 includes one or more rails 78 that extend between first and second guide brackets 80, 82, respectively positioned at the first and second ends 72, 76 of the frame 40. As most clearly shown in FIG. 4B, the sled 32 includes first and second sled mounts 84, 86 structured to slidably mount to the one or more rails 78 of the sled guide 42. The sled 32 may include sleeves or ferules 88 that interface with the one or more rails 78.

The sled 32 further includes a mounting surface 36 for stably mounting a workpiece to be sharpened. The mounting surface 36 includes a mounting fitting 38 configured to hold the workpiece thereon as the sled 32 moves along the sled guide 42 along the sharpening path 28 and relative to the sharpening tool 12 and implement 14 thereof to sharpen the workpiece. As best shown in the top view provided in FIG. 4D, the mounting fitting 38 includes a clamp 90. The clamp 90 is configured to clamp a workpiece at the mounting surface 36 to thereby hold the workpiece thereon. The clamp 90 is positioned adjacent to the first sled mount 84, providing stability when clamping. In other embodiments, the clamp 90 may be positioned at other locations along the mounting surface 36. Other or further mounting fittings 38 and mounting methods of holding the workpiece may also be used, e.g., holes extending into or through the mounting surface 36 through which workpieces may be threadably engaged, bolted, pinned, or bracketed to the mounting surface 36. In the illustrated embodiment, the sled 32 further includes a mounting fitting 38 comprising a cam 92. The cam 92 may be operable to abut a workpiece to further maintain a desired position of the workpiece on the mounting surface 36. The cam 92 may be rotated to a desired orientation and then secured with a bolt 94 at the mounting surface 36. As shown, the cam 92 has a "D" shape. Other shapes may be used, e.g., arcuate, linear, toothed, etc.

The first support 70 includes a mounting bracket 96 that is mountable to the platform 60. The mounting bracket 96 includes attachment members comprising holes 98 (see, e.g., FIG. 3) dimensioned to receive bolts or screws 100 (see, e.g., FIG. 4B) for stably mounting the mounting bracket 96 to the platform 60. Other attachment members and configurations may also be used. For example, in some embodiments, the first support 70 is integral with the platform 60, in which case the platform 60 may be considered the first support 70. In these or other embodiments, the platform 60 may be separate or integral with the sharpening tool 12.

The mounting surface 36 further includes an extension 102. As best shown by comparison of the elevated end view provided in FIG. 4C with the perspective view provided in FIG. 4A, the first support 70 includes a roller 104. The roller 104 is rotatable mounted on the mounting bracket 96 and is rotatable in the direction of movement of the sled 32. The roller 104 may provide additional support for the sled 32 when the sled 32 includes a mounting surface 36 extension 102. In operation, when the sled 32 moves along the sharpening path 28, the mounting surface 36 extension 102 may engage and rotate the roller 104 to provide additional support along the extension. In various embodiments, the roller may be positioned offset, adjacent to, or directly below the sharpening implement 14 in the physically engaged position.

The second support 74 includes feet 106 positionable on a surface to support the second end 76 of the frame 40. In some embodiments, the first support 70 also includes feet. For example, the frame 40 may be configured to straddle the platform 60 or be usable without a platform 60. In some embodiments, the frame 40 may couple to the sharpening tool 12 at the first end 72 or second end 76 or at a position therebetween.

The second guide bracket 82 may include path adjusters 48 configured to adjustably receive the sled guide 42 to modify the sharpening path 28, e.g., to accommodate different sized workpieces or portions of workpieces to be sharpened. Various adjustable retention members may be used to adjustably retain the sled guide 42 or rail 78 thereof, such as clamps. In the illustrated embodiment, the second guide bracket 82 includes threaded holes dimensioned to receive retention members comprising thumb screws 110 generally transverse to the rail 78. The thumb screws 110 may be rotated in a first direction to allow the rail 78 to move relative to the second guide bracket 82 and then rotated in a second direction to compressibly engage the rail 78 and thereby retain the position of the rail 78 within the second guide bracket 82.

As shown in FIG. 3, the blade sharpening system 10 may include path adjusters 48 comprising one or more stops along the frame 40, e.g., the sled guide 42, to define the sharpening path 28. In some embodiments, the stops are hard or fixed stops. As shown, the stops include floating stops 68. Specifically, the sharpening fixture 34 includes two sets of floating stops 68 positionable along the one or more rails 78 of the sled guide 42 to define a length of the sharpening path 28. The floating stops 68 include retention members comprising thumb screws 112 that may be threaded into stop brackets 114 and compressed against the rail 78 to secure the position of the floating stop 68.

As shown in FIGS. 4A-4D, the blade sharpening system 10 may include a guide adjuster 46 to adjust the location of the sharpening path 28 relative to the sharpening implement 14 in the physically engaged position. For example, the guide adjuster 46 may adjust an angle of the sharpening path 28 with respect to the sharpening implement 14 in the physically engaged position. The guide adjuster 46 may be used to laterally adjust the location of the sharpening path 28 with respect to the sharpening implement 14, which may adjust a relative location along the sharpening implement 14 where the sharpening surface 16 contacts the workpiece. For example, the guide adjuster 46 may be used to sharpen a first surface and a second surface of a workpiece wherein the first and second surfaces are lateral edges on opposite lateral sides of the workpiece. Thus, the guide adjuster 46 may allow adjustment of the blade sharpening system 10 to sharpen both right hand cut and left hand cut mower blades.

In the configuration shown, the guide adjuster 46 includes an adjustment rod 116 cooperatively coupled with the mounting bracket 96 and first guide bracket 80. A first portion 118 of the mounting bracket 96 is mountable to the platform 60 in a fixed position and includes a threaded slot 120 through which the adjustment rod 116 may be threadably extended. As most clearly shown in the bottom view provided in FIG. 4B, a second portion 122 of the mounting bracket 96 includes an extension 124, which may be a pin or bolt 100, for example, that extends through a slot 126 defined through the platform 60. The extensions 124 are coupled to a plate 128 positioned below the platform 60 to thereby slidably mount the second portion 122 of the mounting bracket 96 and the first guide bracket 80 along the platform 60. A first end of the adjustment rod 116 may be rotatably coupled to the second portion 122 of the mounting bracket 96. A second end of the adjustment rod 116 may include a handle 134 dimensioned be gripped by a user to rotate the adjustment rod 116. To adjust the forward position of the sled guide 42 at the first end 72, the adjustment rod 116 may be rotated to obtain a desired sharpening path 28 relative to the sharpening surface 16 by increasing or decreasing the distance between the first and second portions 118, 122 of the mounting bracket 96.

The embodiments illustrated in FIGS. 2-4D further include a sled drive 30 configured to move the sled 32 along the sharpening path 28 in a first direction and a second direction. As best shown in FIG. 4B and the magnified view provided therein, the sled drive 30 includes a chamber 136 housing a piston (not shown) coupled to a rod 138. As shown, the chamber 136 comprises a pneumatic chamber, such as a pneumatic cylinder. The piston is movable through the chamber 136 via introduction and release of compressed gas. The movement of the piston is coupled to the sled 32 via the rod 138 coupled to the piston that extends from a first end 140 of the chamber 136 and which includes a clevis 142 that is attached to the sled 32. A second end 144 of the chamber 136 is coupled to the frame 40 at the second support 74. In other embodiments, the chamber 136 may be coupled to the frame 40 and sled 32 in a different configuration, such as reversed. The chamber 136 includes a first fluid port 146 at the first end 140 and a second fluid port 148 at the second end 144. Compressed gas supplied to the second fluid port 148 drives the piston and, hence, the coupled sled 32 in the first direction, toward the first end 72 of the frame 40. Compressed gas supplied to the first fluid port 146 drives the piston and, hence, the coupled sled 32 in the second direction, toward the second end 76 of the frame 40.

Compressed gas may be supplied by a drive motor (see, e.g., FIG. 1) that drives a pump to produce a supply of compressed gas.

The blade sharpening system 10 may further include a controller 50 to control the flow of the supply of compressed gas to and from the chamber 136. In the illustrated embodiment, the controller 50 includes a drive switch 52, which in this embodiment comprises an air switch. As best shown in the magnified view provided in FIG. 4A, the drive switch 52 includes an air supply inlet 152 to receive the supply of compressed gas and a first port 154 and a second port 156. Hoses (not shown) may be used to couple the air supply inlet 152 with the supply of compressed gas and the two ports 154, 156 with the two fluid ports 146, 148. The drive switch 52 further includes release ports 158 operable to release compressed gas passed to the drive switch 52 from the fluid ports 146, 148. The drive switch 52 includes valves (not shown) operable to control the delivery and release of compressed gas into the chamber 136. For example, to move the sled 32 along the sharpening path 28 in the first direction, the controller 50 allows compressed gas to be supplied to the second fluid port 148 through the second port 156 while allowing compressed gas to be released from the first fluid port 146 to the first port 154 and through a release port 158. To move the sled 32 along the sharpening path 28 in the second direction the controller 50 allows compressed gas to be supplied to the first fluid port 146 through the first port 154 while allowing compressed gas to be released from the second fluid port 148 to the second port 156 and through a release port 158.

The controller 50 also includes a position sensor 54 in communication with the drive switch 52. The position sensor 54 measures a position (or in some embodiments, movement) of the arm 26 which is used by the controller 50 control the operations of the drive switch 52 to modulate or control operation of the sled drive 30 to drive the sled 32 along the sharpening path 28. Thus, the operations of the drive switch 52 may be coupled to the position of the arm 26 to thereby coordinate the movement of the sled 32 along the sharpening path 28 with the movement of the arm 26. Accordingly, the illustrated blade sharpening system 10 is configured to initiate a predefined movement of the sled 32 when the arm 26 is located in predefined positions. Specifically, the controller 50 initiates movement of the sled 32 in the first direction, as described above, when the arm 26 (and, hence, the sharpening implement 14) is translated from the disengaged position to the engaged position. When the arm 26 (and, hence, the sharpening implement 14) is translated from the engaged position to the disengaged position, the controller 50 initiates movement of the sled 32 in the second direction, as described above. As introduced above, the engaged position may be a position wherein the sharpening surface 16 of the sharpening implement 14 is adjacent to but not in physical contact with the workpiece 24. For example, the engaged position may be about an inch above the workpiece 24. Larger or smaller distances may be used.

In the illustrated embodiment, the drive switch 52 and position sensor 54 comprise a micro switch wherein rotation 25 of the arm 26 to a predefined engagement position actuates the position sensor 54 that actuates the drive switch 52. The sensitivity of the micro switch may be adjusted by a user by adjusting adjustment screws 69 to change a distance between the drive switch 52 or position sensor 54 and a bracket 64 that mounts the controller 50 to the sharpening tool 12. Accordingly, a user may thereby define the engagement position with respect to measurement of arm 26 position or triggering of the drive switch 52 where translation to and from causes the controller 50, via the position sensor 54 and drive switch 52, to initiate the sled drive 30 to move the sled 32. In some embodiments, the position sensor 54 incorporates position sensing technologies, such as optical, magnetic, electrical, electromagnetic, etc. to measure the movement or position of the arm or other associated component, which may be communicated to the drive switch 52, e.g., electrically, mechanically, etc.

As described above with respect to FIG. 1, in some embodiments, the blade sharpening system 10 is configured to allow the user to control the movement of the sled 32 in other manners, which may be instead of or in addition to coordination with the movement or position of the arm 26. For example, in one embodiment, a foot switch or trigger may be used to initiate movement in the first direction, second direction, or both. In some embodiments, the powering on or off of the implement motor 22 or engagement or disengagement of the sharpening motion 17 of the implement may be coupled or coordinated with the movements of the sled.

Figure 4A:
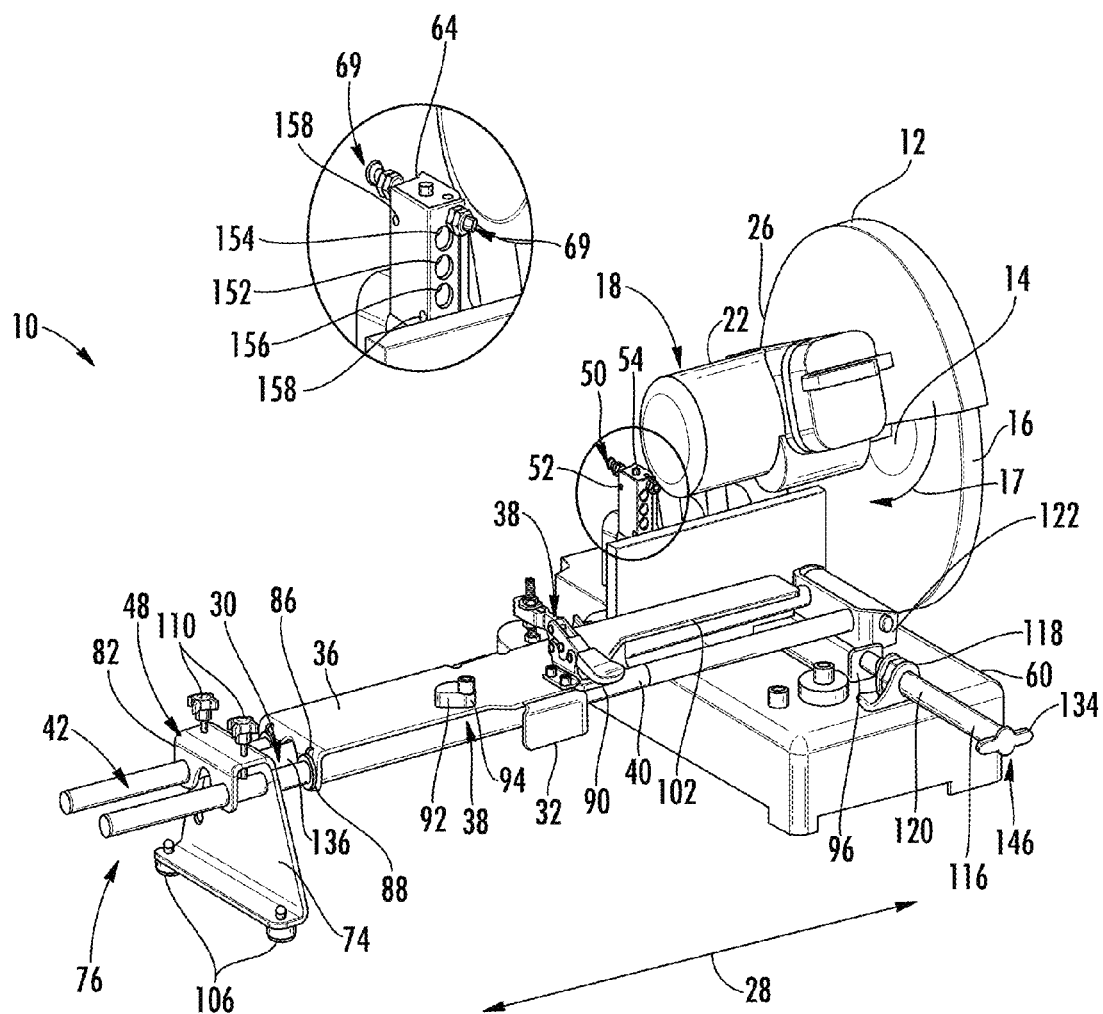
FIG. 4A is a perspective view of a blade sharpening system including a magnified view of a controller according to various embodiments described herein.
Figure 4B:
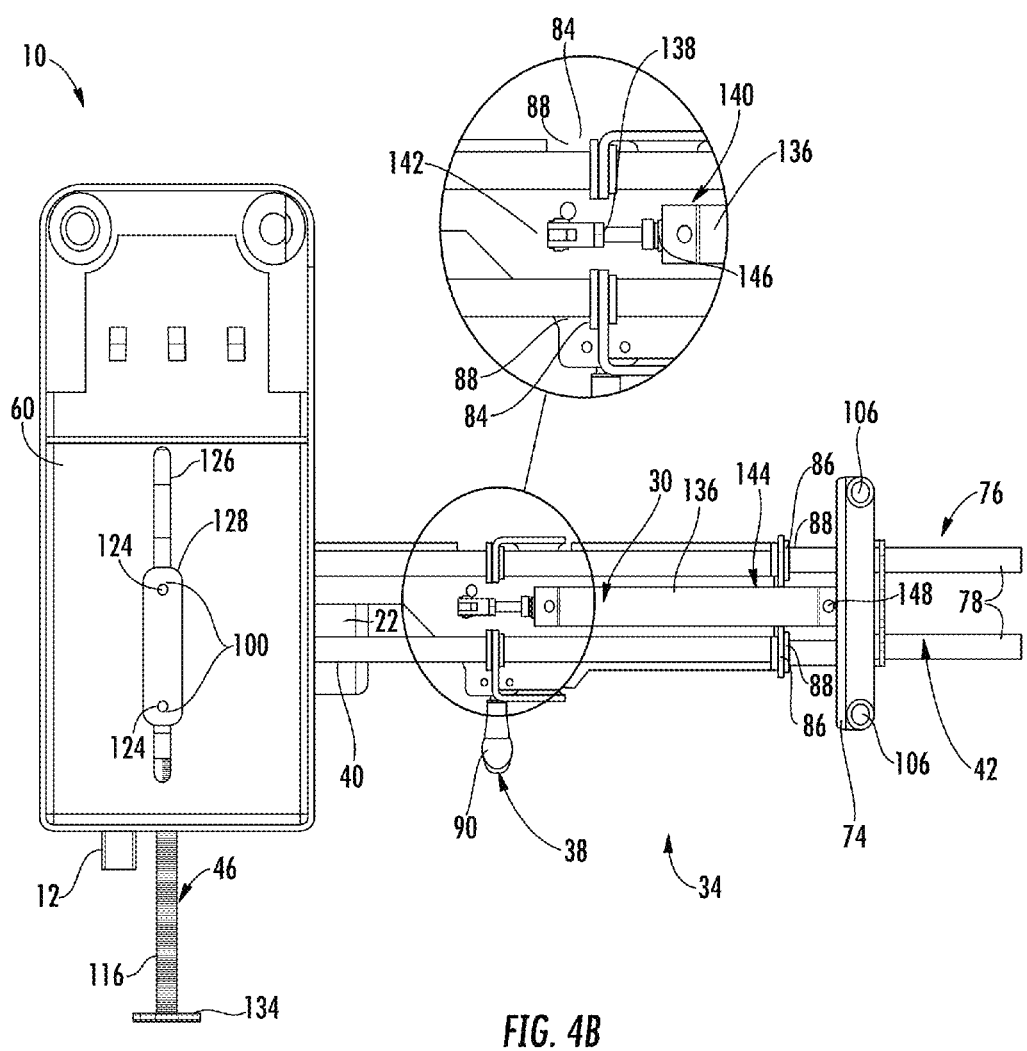
FIG. 4B a bottom view of the blade sharpening system shown in FIG. 4A including a magnified view of a coupling between a sled and a sled drive.
Figure 4C:
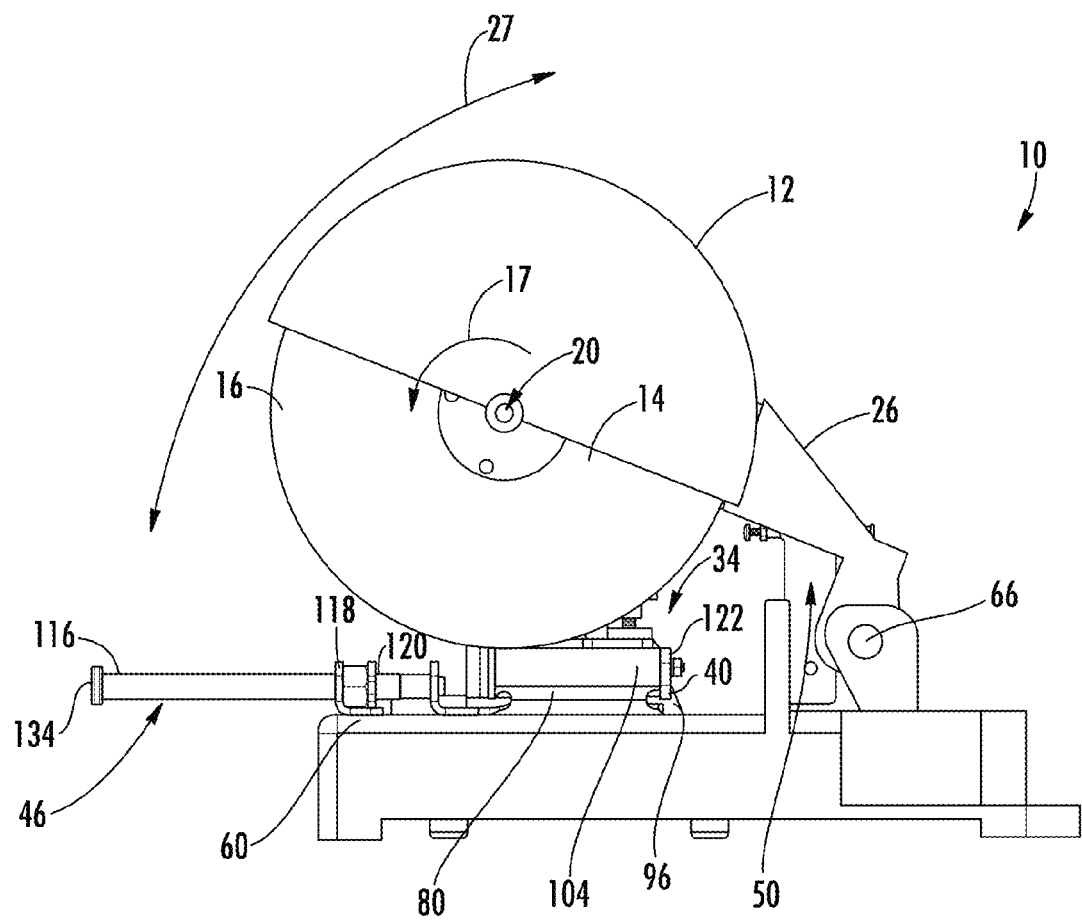
FIG. 4C is a perspective end view of the blade sharpening system shown in FIG. 4A.
Figure 4D:
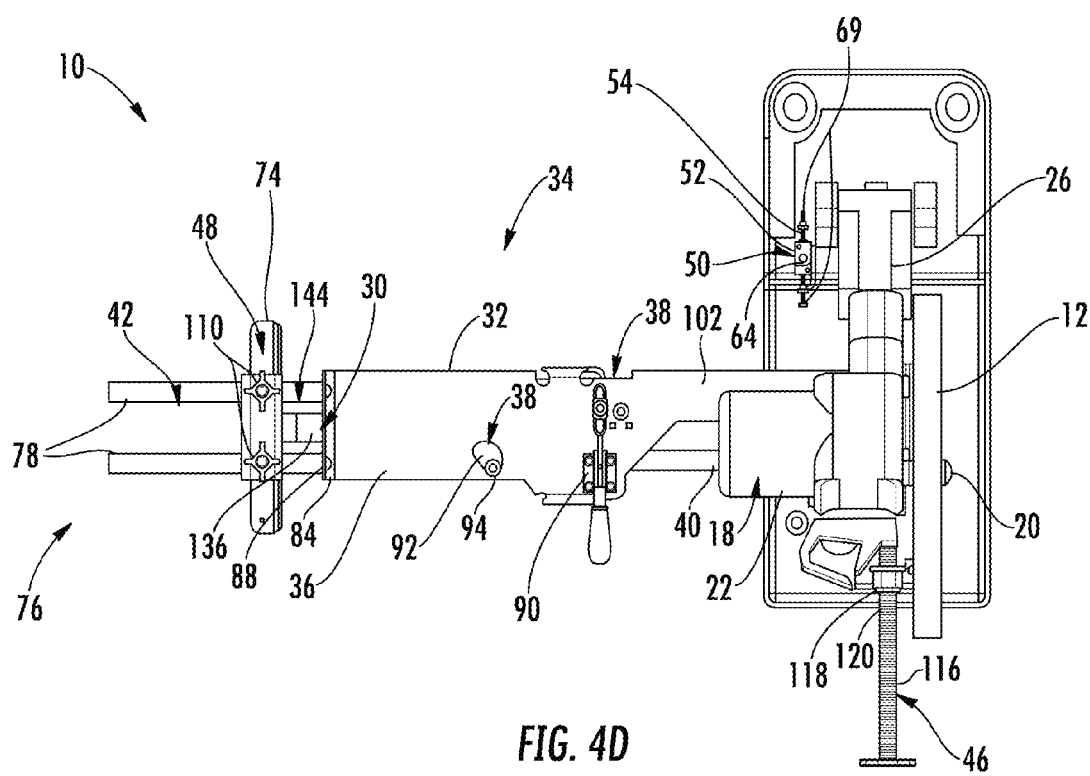
FIG. 4D is a top view of the blade sharpening system shown in FIG. 4A.
Figure 5A:
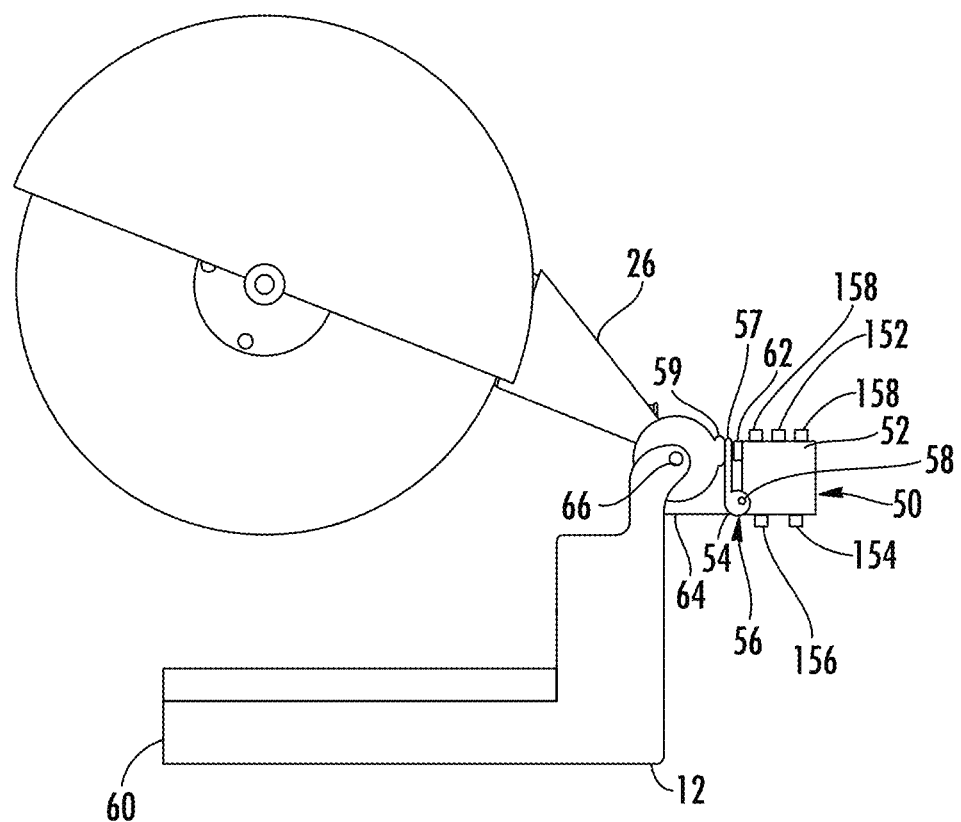
FIG. 5A and FIG. 5B illustrate elevated side views of a controller of a blade sharpening system according to various embodiments described herein.
Figure 5B:
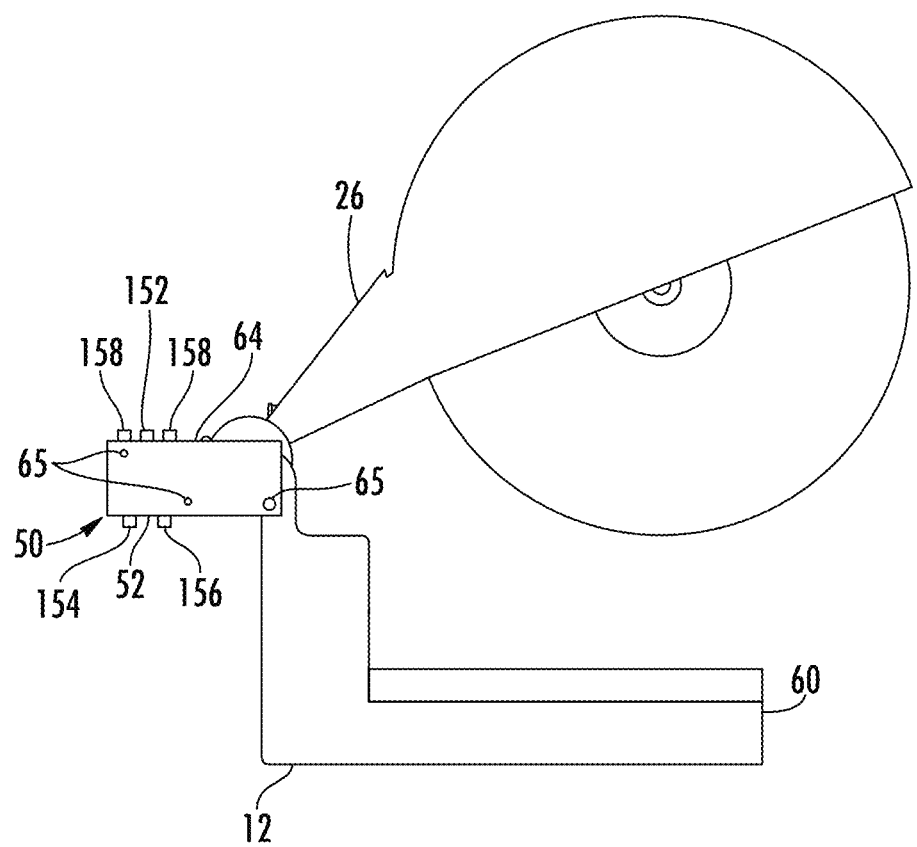

FIGS. 5A & 5B illustrate side views of a controller 50 comprising a drive switch 52 and a position sensor 54 of a blade sharpening system according to various embodiments. The controller 50 is described with respect to the sharpening tool 12 and sharpening fixture 34 illustrated in FIG. 4A-4D; however, the controller 50 may be used with other embodiments and combinations described herein. The drive switch 52 may be similar to the drive switch 52 described above with respect to the embodiments shown in FIG. 2 and FIGS. 4A-4D, where like numbers indicate like features.

The position sensor 54 is operatively associated with the drive switch 52 to communicate a position of the arm 26. For example, as shown in FIG. 5A, the position sensor 54 is positioned to mechanically actuate an actuator 55 of drive switch 52 to trigger the operations of the drive switch 52 via the arm 26 position of the sharpening tool 12. The position sensor 54 comprises a rocker assembly 56 that attaches between the drive switch 52 and the arm 26 adjacent to the arm pivot 66. The rocker assembly 56 includes a rocker 57 that is pivotably attached at pivot 58. The arm 26 includes a protrusion 59 positioned to contact the rocker 57 when the arm 26 is pivoted on pivot 66 to the engagement position. The contact repositions the rocker 57 to engage an actuator 62 operatively coupled with the drive switch 52 to cause the switching operation of the drive switch 52 that initiates movement of the sled via the sled drive (see, e.g., FIG. 4B).

The degree of contact between the protrusion 59 and the rocker 57 may be adjusted to calibrate the controller 50 such that actuation of the drive switch 52 triggers operation of the sled drive at a desired engagement position of the arm 26. For example, calibration may include repositioning pivot 58 along the rocker assembly 56 or the rocker 57 on pivot 58, e.g., adjusting a screw forming the pivot 58 that extends through an elongated slot in the rocker assembly 56 or rocker 57 to raise or lower the pivot point of the rocker 57 with respect to the protrusion 59 or actuator 55. As best shown in FIG. 5B, the drive switch 52 and position sensor 54 may attach to the sharpening tool 12 along a bracket 64. The bracket 64 may include various elongated mounting slots 65 to adjust a distance between the drive switch 52, e.g., actuator 62, and the rocker 57 or protrusion 59 or the rocker 57 and protrusion 59. Adjusting one or more distances between the drive switch 52, rocker 57, and protrusion 59 may also be used to adjust or calibrate the controller 50 to a desired engagement position of the arm 26 for different sized workpieces. Other configurations may also be used. For example, as best shown in FIG. 4D, the drive switch 52, as shown in FIGS. 5A & 5B or in another embodiment, may be mounted to bracket 64 between adjustment screws 69 to adjust a distance between the drive switch 52 and the bracket 64 and, hence, the arm 26 and position sensor 54.

In the embodiments shown in FIG. 2, FIGS. 4A-4D, and FIGS. 5A & 5B, the drive switch 52 and position sensor 54 are mounted with respect to the platform 60 such that the arm 26 moves relative to the drive switch 52 and position sensor 54. In some embodiments, the rocker 57 may be attached to the arm 26 to couple the rocker 57 to the movement of the arm 26 to actuate the actuator 55, wherein the drive switch 52 is mounted with respect to the platform 60.

Those skilled in the art will appreciate upon reading this disclosure that various drive switches 52 may be used to initiate the sled drive. For example, in one embodiment, the drive switch 52 may be a double acting switch operable to trigger the sled drive to translate the sled back and forth along the sharpening path automatically when the drive switch 52 is activated. For example, a user could move the arm 26 to the engagement position to trigger the drive switch 52 which then initiates the sled drive to move the sled along the sharpening path in a first direction and subsequently back in a second direction. In a further embodiment, the drive switch 52 may further initiate repeated movement of the sled back and forth until the arm 26 is moved to the disengaged position.

In the embodiments illustrated in FIGS. 2-5B, the speed the sled 32 moves along the sharpening path 28 may be modified by altering one or more of the gas supply pressure or air exhaust from the air release ports 158. For example, in some such configurations, gas pressures between 80 psi and 120 psi are considered to provide a suitable speed for most blade designs and users when combined with around 5 to 6 horsepower sharpening tools 12. However, as the dimensions and design of the pneumatic chamber 136, workpiece, sharpening implement 14, and power of the sharpening tool 12 may similarly alter the speed of the sled 32 or suitability of a speed of the sled 32 for sharpening a particular workpiece lesser or greater gas pressures supplied to the chamber 136 may also be suitable.

In one embodiment, the sharpening tool 12 may comprise a modified chop saw, such as a metal chop saw, having a grinding stone mounted to the arbor. In one example, the sharpening tool 12 may comprise a modified DeWALT® D28715 chop saw. Modification may include mounting a grinding stone, e.g., an 8 inch grinding stone, to the arbor and removing the original equipment clamping bracket and threaded locking device. In a further embodiment, the sharpening fixture 34 may be mounted to the modified chop, e.g., onto the modified chop saw table, which may correspond to the platform 60 described herein. In a further example, modifying the modified chop saw includes slidably mounting the second portion of the mounting bracket 122 to the platform 60, which may be similar to that shown above with respect to FIGS. 4A-4D. For example, the second portion of the mounting bracket 122 may be slidably mounted to the platform 60 via an extension 124 and plate 128 that extend through a slot 126 defined through the platform 60. The second portion of the mounting bracket 122 may be coupled to the first end of the adjustment rod 116 that extends through the first portion of the mounting bracket 118, which fixedly mounts to the platform 60. The adjustment rod 116 may threadably engage the first portion of the mounting bracket 118 such that it may be rotated to adjust the distance between the first portion of the mounting bracket 118 and the second portion of the mounting bracket 122 (and, hence, the first guide bracket 80). Thus, a user may adjust the position or angle that the sharpening path 28 extends with respect to the sharpening implement 14 or sharpening surface 16 thereof, to sharpen a blade edge on the left or right side of a workpiece. In this or another embodiment, the modified chop saw may be fitted with a controller 50, e.g., the controller 50 described above with respect to the illustrated embodiments, comprising a drive switch 52, such as an air switch, and position sensor 54 positioned to measure a position of the movable arm 26 of the modified chop saw. When the position sensor 54 detects that the arm 26 has translated from a disengaged position to an engaged position, the drive switch 52 is triggered to initiate the sled drive 30 to move the sled 32 in a first direction along the sharpening path 28. When the position sensor 54 detects that the arm has translated from the engaged position toward the disengaged position, the controller 50 triggers the drive switch 52 to initiate the sled drive 30 to move the sled 32 in a second direction along the sharpening path 28.

As described above, other switches and position sensors may be used. Also as described above, the position sensor 54 may be equipped with controller features configured to communicate instructions, e.g., via electrically currents or signals, to the drive switch 52 to initiate the switching operations of the drive switch 52. In one example, the position sensor 54 and drive switch 52 are integrated or the position sensor 54 includes additional switches operable to communicate the position of the arm 26 or associated component thereof to the drive switch 52. In one embodiment, the position sensor 54 comprises a micro switch.

In a further embodiment, the modified chop saw is associated with a sharpening fixture 34, as shown in FIGS. 2-4D, wherein the sled drive 30 comprises an air cylinder to move the sled 32 back and forth. The controller 50 may comprises an air controller that includes an drive switch 52 and a position sensor 54 attached to the chop saw. When the arm 26 is lowered, the sled 32 moves in one direction along the sharpening path 28 while the user applies pressure down and grinds the blade. When the arm 26 is raised, the sled 32 moves back. This steady movement while grinding may be repeated to produce a machine sharpened surface that compares with a factory new edge, in less time of conventional sharpening. For example, using a 5.5 horsepower implement motor 22, and supplying compressed gas into the chamber 136 at 100 psi, and release ports bored to a #60 drill bit, blades were mounted and sharpened at a pace of about one mower blade per minute, which is vastly superior to the typical rate of one mower blade every five minutes using conventional sharpening tools and techniques. Additionally, unlike conventional sharpening tools and techniques that require users to handle hot blades and expose them to injuries from kickback, the blade sharpening system 10 described herein, wherein the motion or position of the movable arm 26 operatively couples with the movement of the sled 32, allows a user to sharpen a mower blade without holding the blade while sharpening.

In some embodiments, the blade sharpening system 10 includes a sharpening fixture 34 configured to mount to one or more sharpening tools. For example, the sharpening fixture 34 may be provided in as kit for mounting to a sharpening tool. Similarly, the kit may include the sled drive 30 or components thereof. In one embodiment, a kit includes a sled drive 30 or components thereof for modular fitting with a frame 40 of a sharpening fixture 34. In one embodiment, the blade sharpening system 10 includes the sharpening tool 12 provided in a kit configured for attachment to a sharpening fixture or for use without a sharpening fixture. It will be appreciated that sharpening tools may be provided without grinding stones, wherein grinding stones may be provided separately for mounting. Thus, sharpening tools 12 provided without grinding stones or mounted grinding stone are contemplated in this disclosure. Similarly, blade sharpening systems 10 including implement mounts 20 structured to mount implement 14 as described herein are contemplated herein.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" refers to "x", "y", or both "x" and "y", whereas "either x or y" refers to exclusivity.

This disclosure describes various elements, features, aspects, and advantages of various embodiments, configurations, and arrangements of the blade sharpening systems, components for use with blade sharpening systems, and methods thereof. It is to be understood that certain descriptions of the various embodiments and such configurations and arrangements thereof have been simplified to illustrate only those elements, features and aspects that are relevant to a more clear understanding of the disclosed embodiments, while eliminating, for purposes of brevity or clarity, other elements, features and aspects. Any references to "various," "certain," "some," "one," or "an" when followed by "embodiment," "configuration," or "arrangement" generally means that a particular element, feature or aspect described in the example is included in at least one embodiment. The phrases "in various," "in certain," "in some," "in one," or "in an" when followed by "embodiment", "configuration", or "arrangement" may not necessarily refer to the same embodiment. Furthermore, the phrases "in one such" or "in this" when followed by "embodiment," "configuration," or "arrangement," while generally referring to and elaborating upon a preceding embodiment, is not intended to suggest that the elements, features, and aspects of the embodiment introduced by the phrase are limited to the preceding embodiment; rather, the phrase is provided to assist the reader in understanding the various elements, features, and aspects disclosed herein and it is to be understood that those having ordinary skill in the art will recognize that such elements, features, and aspects presented in the introduced embodiment may be applied in combination with other various combinations and sub-combinations of the elements, features, and aspects presented in the disclosed embodiments. It is to be appreciated that persons having ordinary skill in the art, upon considering the descriptions herein, will recognize that various combinations or sub-combinations of the various embodiments and other elements, features, and aspects may be desirable in particular implementations or applications. However, because such other elements, features, and aspects may be readily ascertained by persons having ordinary skill in the art upon considering the description herein, and are not necessary for a complete understanding of the disclosed embodiments, a description of such elements, features, and aspects may not be provided. For example, ovens and oven systems described herein may also include connections such as fittings for one or more of electrical connections, gas connections, or flue connections. As such, it is to be understood that the description set forth herein is merely exemplary and illustrative of the disclosed embodiments and is not intended to limit the scope of the invention as defined solely by the claims.

What is claimed is:

1. A blade sharpening system for use with a translatable sharpening implement, the system comprising:
    a sharpening fixture comprising
        a sled having a mounting surface for removably mounting a workpiece to be sharpened,
        a frame comprising a sled guide configured to guide the sled along a sharpening path, the sled guide comprising one or more rails to which the sled mounts and is thereon guidable along the sharpening path, and
        a sled drive operable to move the sled along the sharpening path, wherein the sled is configured to position a workpiece mounted to the mounting surface below a sharpening surface of a sharpening implement when the sharpening implement is in an engaged position; and
    a controller comprising
        a drive switch to initiate the sled drive to move the sled along the sharpening path,
        wherein, when the sharpening implement is translated from a disengaged position to the engaged position, the drive switch initiates the sled drive to move the sled along the sharpening path in a first direction,
        wherein, when the sharpening implement is translated from the engaged position to the disengaged position, the drive switch initiates the sled drive to move the sled along the sharpening path in a second direction, and
        wherein the engaged position includes a physically engaged position, and wherein, in the physically engaged position, the sharpening surface of the sharpening implement is positioned to physically engage a workpiece mounted to the mounting surface as the sled moves along the sharpening path.

2. The system of claim 1, wherein the sled drive comprises an air cylinder operatively coupled between the frame and the sled, and wherein the drive switch comprises an air switch.

3. The system of claim 1, further comprising:
    a first guide bracket comprising a first portion and a second portion, the second portion slidable relative to the first portion; and
    a second guide bracket, wherein the sled guide extends between the second portion of the first guide bracket and the second guide bracket,
    wherein an adjustment rod couples the first portion and second portion of the first guide bracket, and wherein the adjustment rod threadably couples to the first portion of the first guide bracket such that rotation of the adjustment rod adjusts a length of the adjustment rod that extends between the first and second portions of the first guide bracket to thereby adjust a location of the sharpening path relative to the first portion of the first guide bracket.

4. The system of claim 3, wherein the mounting surface comprises a mounting member structured to removably mount a workpiece, and wherein the mounting member comprises one or more of a clamp or an adjustable cam.

5. The system of claim 4, wherein the second guide bracket is structured to adjustably receive the sled guide to define a length of the sled guide extending between the first and second guide brackets.

6. The system of claim 5, wherein the first guide bracket includes a roller positioned to support a portion of the sled below the sharpening implement when the sharpening implement physically engages the workpiece while the sled moves along the sharpening path.

7. A blade sharpening system for use with a translatable sharpening implement, the system comprising:
   a sharpening fixture comprising
      a frame,
      a sled mountable to the frame and movable thereon along a sharpening path, wherein the sled comprises a mounting surface for removably mounting a workpiece to be sharpened, and
      a sled drive operable to move the sled along the sharpening path, wherein the sled is configured to position a workpiece mounted to the mounting surface below a sharpening surface of a sharpening implement when the sharpening implement is in an engaged position; and
   a controller comprising
      a drive switch to initiate the sled drive to move the sled along the sharpening path,
      wherein, when the sharpening implement is translated from a disengaged position to the engaged position, the drive switch initiates the sled drive to move the sled along the sharpening path in a first direction,
      wherein when the sharpening implement is translated from the engaged position to the disengaged position, the drive switch initiates the sled drive to move the sled along the sharpening path in a second direction.

8. The system of claim 7, wherein the engaged position further includes a physically engaged position, wherein, in the physically engaged position, the sharpening surface of the sharpening implement is positioned to physically engage a workpiece mounted to the mounting surface as the sled moves along the sharpening path.

9. The system of claim 7, wherein the sled drive comprises an air cylinder operatively coupled between the frame and the sled, and wherein the drive switch comprises an air switch.

10. The system of claim 7, wherein the frame comprises a first support comprising a mounting bracket for mounting the frame to a platform below an arm onto which the sharpening implement mounts, wherein the arm is pivotable to translate the sharpening implement between the disengaged and engaged positions.

11. The system of claim 7, wherein the frame comprises a sled guide comprising one or more rails that guide the sled along the sharpening path.

12. The system of claim 11, wherein the one or more rails of the sled guide extend between a first guide bracket and a second guide bracket.

13. The system of claim 12, wherein the sharpening fixture includes a path adjuster to adjust a length of the one or more rails extending along the sharpening path between the first and second guide bracket.

14. The system of claim 12, wherein the second guide bracket includes a slot to adjustably receive the one or more rails.

15. The system of claim 12, wherein the sharpening fixture includes one or more floating stops slidably mounted along the one or more rails and fixable at one or more positions therealong to adjust a length of the one or more rails along which the sled may be guided.

16. The system of claim 12, wherein the first guide bracket includes a roller positioned to support a portion of the sled below the sharpening implement when the sharpening implement physically engages a workpiece mounted to the mounting surface while the sled moves along the sharpening path.

17. The system of claim 7, wherein the frame includes a sled guide extending along the sharpening path between a first support comprising a first guide bracket and a second support comprising a second guide bracket, wherein the sled is movable along the sled guide between the first guide bracket and the second guide bracket, and wherein the second guide bracket adjustably receives the sled guide to define a length of the sled guide extending between the first and second guide brackets to thereby define a length of the sharpening path.

18. The system of claim 7, wherein the frame includes a sled guide along which the sled drive moves the sled along the sharpening path, and wherein the sharpening fixture includes a guide adjuster to adjust a position of the sled guide to thereby adjust an angle or position at the sharpening path passes below the sharpening surface of the sharpening implement.

19. The system of claim 18, further including
   a first guide bracket comprising a first portion and a second portion, the second portion slidable relative to the first portion; and
   a second guide bracket, wherein the sled guide extends between the second portion of the first guide bracket and the second guide bracket, wherein an adjustment rod couples the first portion and second portion of the first guide bracket, and wherein the adjustment rod threadably couples to the first portion of the first guide bracket such that rotation of the adjustment rod adjusts a length of the adjustment rod that extends between the first and second portions of the first guide bracket to thereby adjust a location of the sharpening path relative to the first portion of the first guide bracket.

20. The system of claim 7, wherein the mounting surface comprises one or more mounting members structured to removably mount a workpiece, and wherein the one or more mounting members comprise at least one of a clamp or an adjustable cam.

* * * * *